United States Patent [19]

Müller et al.

[11] 4,296,776

[45] Oct. 27, 1981

[54] GATE VALVE FOR USE IN LARGE SIZE CONDUITS

[75] Inventors: Rudolf Müller, Merzenich; Franz Lengsfeld, Julich; Johannes Uerlichs, Woffelsbach, all of Fed. Rep. of Germany

[73] Assignee: Hermann Rappold & Co. GmbH, Duren, Fed. Rep. of Germany

[21] Appl. No.: 123,885

[22] Filed: Feb. 22, 1980

[30] Foreign Application Priority Data

Mar. 10, 1979 [DE] Fed. Rep. of Germany ....... 2909467

[51] Int. Cl.$^3$ ............................................ F16K 49/00
[52] U.S. Cl. ..................................... 137/340; 251/327
[58] Field of Search ......................... 137/340; 251/327

[56] References Cited

U.S. PATENT DOCUMENTS

| | | | |
|---|---|---|---|
| 3,202,171 | 8/1965 | Rappold et al. | 137/340 |
| 3,292,654 | 12/1966 | Rappold et al. | 137/340 |
| 3,394,728 | 7/1968 | Uerlichs | 137/340 |
| 3,695,286 | 10/1972 | Uerlichs et al. | 137/340 |
| 3,830,251 | 8/1974 | Uerlichs et al. | 137/340 |

Primary Examiner—Gerald A. Michalsky
Attorney, Agent, or Firm—Wenderoth, Lind & Ponack

[57] ABSTRACT

A gate valve includes a water cooled valve casing coaxially attachable to a conduit and a valve plate mounted in the valve casing for sliding movement relative thereto between open and closed positions of the conduit. The valve casing includes a pair of annular mounting flanges adapted to be connected to the conduit and a pair of annular U-shaped sealing rings. Each sealing ring is positioned radially inwardly of a respective mounting flange, and the sealing rings are positioned on opposite axial sides of the valve plate. Each sealing ring includes a web portion, an inner leg portion extending generally radially outwardly from the web portion and forming a sealing surface for the valve plate, and an outer leg extending generally radially outwardly from the web portion. Each outer leg is connected to a respective mounting flange. The valve casing defines therein an enclosed interior space through which cooling water is adapted to flow. A support device is positioned within the interior space for transmitting to at least one mounting flange the stress applied to the respective sealing surface by the valve plate. The support device includes a first end portion supported against and fixed to the one mounting flange and a second portion freely contacting the respective inner leg without attachment thereto. The support device has a cross-section so as to not appreciably interfere with or restrict the flow of cooling water within the interior space of the valve casing.

10 Claims, 4 Drawing Figures

4,296,776

GATE VALVE FOR USE IN LARGE SIZE CONDUITS

BACKGROUND OF THE INVENTION

The present invention relates to a gate valve for use in conduits or pipelines having large nominal diameters, particularly large size hot air conduits. More particularly, the present invention relates to such a gate valve of the type having a valve casing through which cooling water is circulated and which is formed by mounting flanges attachable to the conduit and a pair of substantially U-shaped sealing rings, with inner legs of the sealing rings forming sealing surfaces for a valve plate which is mounted in the valve casing for sliding movement relative thereto between open and closed positions of the conduit.

Gate valves of this type operate to selectively close or open conduits through which gases flow at high operating temperatures. Accordingly, it is necessary to provide the interior of the conduit and the valve casing with an inner refractory brickwork lining. As a result of the high temperature stresses involved, the thickness of such brickwork lining in modern equipment is often from 300 to 500 mm. Due to this thickness, there is a large distance in the radial direction between the sealing surfaces of the sealing rings of the valve casing and the support surfaces of the mounting flanges of the valve casing. Due to the high speed flow through the large size conduits involved, when the valve plate is in the closed position, the valve plate is under a very considerable pressure, and this pressure is transferred to the sealing surfaces, thereby imparting a substantial stress thereto. This stress must be absorbed by the valve casing, and specifically, by the mounting flanges thereof. Due to the large distance in the radial direction between the sealing surfaces and the mounting flanges, the stress imparted to the sealing surfaces creates a large lever arm within the valve casing, with the result that the valve casing is stressed with large bending moments in the region of the support surfaces of the mounting flanges.

In order to overcome this disadvantage, and at the same time, to achieve sufficient stability of the valve casing, heretofore known gate valves of this type have been provided with gusset plates to absorb axial forces imparted to the sealing surfaces and to transfer such axial forces to the mounting flanges. Such gusset plates have been positioned to extend in the radial direction from the mounting flanges and the outer edge of the valve casing through an interior space within the valve casing and through which cooling water circulates to the sealing ring. In the axial direction, such gusset plates occupy almost the entire cross-section of this interior space through which cooling water is to flow. The construction of such known gate valves is however difficult since it is a very costly procedure to accurately adjust and attach the gusset plates within the interior space and then enclose the interior space with necessary cover plates. In addition, the gusset plates increase the pressure loss of the cooling water flowing through the interior space of the valve casing, tend to promote the deposition of dirt and other deposits, and have an unfavorable effect on the flow of the cooling water, since strong eddy currents occur at the gusset plates, with the resultant formation of dead zones through which the cooling water does not continuously flow.

Attempts to reinforce the valve casing by the use of thicker walls or by steel gusset plates applied inside the refractory lining have the disadvantage that the valve casing is then no longer readily expandable. This results in increased stresses within the construction of the valve casing as a result of temperature differences between the water-cooled inner surfaces and the outer surfaces which are exposed to the hot gas. Such stresses can in practice lead to cracks in the valve casing, and therefore to premature breakdown of the valve.

SUMMARY OF THE INVENTION

With the above discussion in mind, it is an object of the present invention to provide an improved gate valve of the type described above but which overcomes the prior art disadvantages.

It is a further object of the present invention to provide such a gate valve wherein it is possible to allow a large separation in the radial direction between the mounting flanges and the sealing surfaces of the sealing rings, while at the same time, providing the necessary stability and free expandability of the valve casing to ensure a long service life.

It is a still further object of the present invention to provide such a valve wherein the valve casing is inexpensive to construct and fabricate.

It is an even further object of the present invention to provide such a valve wherein the valve casing provides improved cooling with reduced pressure loss of the cooling water or fluid flowing therethrough.

These objects are achieved in accordance with the present invention by the provision of a gate valve of the type including a water cooled casing coaxially attachable to a conduit and a valve plate mounted in the valve casing for sliding movement relative thereto between open and closed positions of the conduit. The valve casing includes a pair of annular mounting flanges adapted to be connected to the conduit and a pair of annularr U-shaped sealing rings, each sealing ring being positioned radially inwardly of a respective mounting flange, with the sealing rings being positioned on opposite axial sides of the valve plate when the valve plate is in the closed position thereof. Each sealing ring includes a web portion, an inner leg extending generally radially outwardly from the web portion and forming a sealing surface for the valve plate, and an outer leg extending generally radially outwardly from the web portion. Each outer leg of each sealing ring is connected to a respective mounting flange. The valve casing defines therein an enclosed interior space through which cooling water is adapted to flow to cool the gate valve. Support means is positioned within the interior space for transmitting to at least one mounting flange the stress applied to the respective sealing surface by the valve plate. This support means has a first end portion supported against and fixed to the one mounting flange and a second end portion freely contacting the respective inner leg of the sealing ring without attachment thereto. The support means has a cross-section transverse to the direction of flow of cooling water within the interior space such that the support means does not appreciably interfere with or restrict such cooling water flow.

By this arrangement, stress imparted to the sealing surface is transmitted and absorbed by the mounting flange. However, by having the second end portion of the support means freely contacting but not attached to the inner leg of the sealing ring, the valve casing readily is able to absorb or adapt to varying degrees of thermal expansion and contraction due to the temperature stresses involved. Due to the fact that the support means is constructed to have dimensions which do not interfere with the flow of the cooling water within the valve casing, the cooling water circulation is not appreciably negatively effected and is improved as compared with prior art gate valves.

In accordance with the further feature of the present invention, the enclosed interior space of the valve casing may include first and second space portions provided on opposite axial sides of the valve plate when the valve plate is in the closed position thereof, and the support means may comprise at least one support element provided in each such space portion.

In accordance with one embodient of the present invention, the support means extends within the interior space of the valve casing at an angle to the center axis of the sealing rings. The outer leg of each sealing ring is connected to the respective mounting flange by a respective outer cover plate which is connected to and extends generally radially between such outer leg and mounting flange. Inner and outer coaxially spaced stiffening plates are positioned within the valve casing coaxially of the sealing rings. The first end portion of the support means is supported against and fixed to the outer stiffening plate and the respective mounting flange. The second end portion of the support means is in free contact with and unattached to the inner stiffening plate and the respective inner leg. In accordance with one feature of this embodiment of the present invention, the support means may comprise an annular member in the form of a truncated cone positioned within the interior space coaxially of the sealing ring. In accordance with an alternative feature of this embodiment of the present invention, the support means may comprise a plurality of elongated members circumferentially distributed within the interior space. Such elongated members may be in the form of bolts, rods, tubes, bars or lamellar formed support members. In accordance with a further embodiment of the present invention, the support means may extend within the interior space substantially parallel to the center axis of the sealing rings. The outer leg of each sealing ring may be directly connected, for example, by welding, to the respective mounting flange. The support means may comprise a plurality of elongated members circumferentially distributed within the interior space. These elongated members may be the same type of members as mentioned above. The elongated members have first ends extending into and fastened within holes provided in the respective mounting flange.

In accordance with a further feature of the present invention, applicable to both embodiments of the present invention, the inner leg of each sealing ring has connected thereto and extending generally radially inwardly thereof an inner cover plate which partially defines and closes the interior space of the valve casing. In this arrangement, the second end portion of the support means is positioned adjacent to and in the region of the connection between the respective inner leg and inner cover plate. The connection between the inner leg and inner cover plate is preferably by welding.

The number and cross-section of the support elements forming the support means in accordance with the present invention may be determined on an individual case by the stresses which will occur on the sealing surfaces of a given installation. An important feature of the present invention however is that the end surface or portion of the support element which is directed toward the sealing surface of the sealing ring must lie in free contact with but be unattached to the inner leg of such sealing ring. In this way, the valve casing is free to expand and deform under stress, and upon release of the stress can be returned to its original state.

BRIEF DESCRIPTION OF THE DRAWINGS

Other objects, features and advantages of the present invention will be apparent from the following detailed description of preferred embodiments thereof, with reference to the accompanying drawings, wherein.

DETAILED DESCRIPTION OF THE INVENTION

Figure 1:
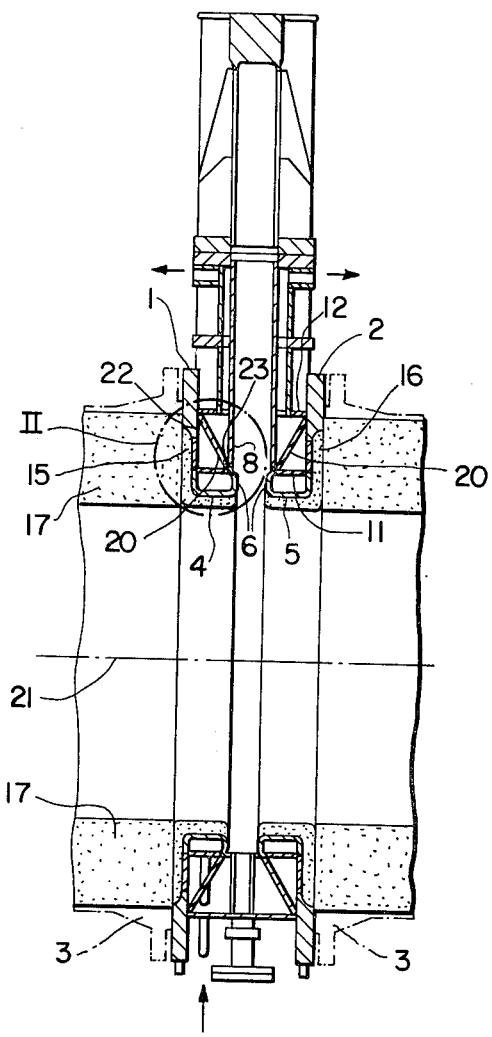
FIG. 1 is a somewhat schematic axial cross-sectional view through a valve casing attached to a large size hot air conduit of a blast furnace in accordance with one embodiment of the improved gate valve of the present invention.
Figure 2:
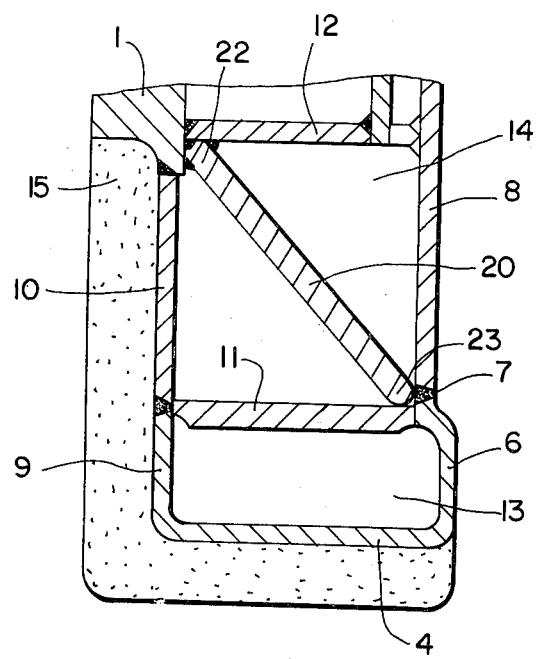
FIG. 2 is an enlarged cross-sectional view of the portion of FIG. 1 indicated by II.

With reference to FIGS. 1 and 2, a first embodiment of the improved gate valve of the present invention will be described. Thus, the gate valve includes a valve casing coaxially attached to a large diameter hot air conduit 3. The gate valve further includes a valve plate (not shown) which is mounted in the valve casing for sliding movement relative thereto between open and closed positions of the conduit 3. The configuration and manner of movement of the valve plate may be any which is known and conventional in the art.

The valve casing includes a pair of annular mounting flanges 1 and 2 to be connected to the conduit 3. Such connection is achieved in any known and conventional manner. The valve casing further includes a pair of annular U-shaped sealing rings 4 and 5 positioned radially inwardly of mounting flanges 1 and 2, respectively. Sealing rings 4 and 5 and the respective mounting flanges 1 and 2 are positioned on opposite axial sides of the axial position of the valve plate (not shown).

Each sealing ring 4 and 5 includes a generally axially extending web portion, an inner leg 6 extending generally radially outwardly from the web portion and forming a sealing surface for the valve plate, and an outer leg 9 extending generally radially outwardly from the web portion. Each outer leg 9 is connected by welding to a respective annular outer cover plate 10 which in turn is connected by welding to the respective mounting flange 1 or 2. Each inner leg 6 has connected thereto, for example by welding 7, an annular inner cover plate 8 which extends generally radially outwardly from the respective inner leg 6.

The interior space of the valve casing is stiffened by radially inner and outer stiffening ring-shaped plates 11 and 12. The inner plate 11 extends generally axially between legs 6 and 9 and is welded thereto. Outer plate 12 extends generally axially and is positioned in the area of the inner portion of the respective mounting flange 1 or 2 and is connected thereto, for example, by welding, and is also connected, for example, by welding to the respective inner cover plate 8. Stiffening plates 11 and 12 divide the interior space of the valve casing into two cooling water channels 13 and 14 which have cooling water flowing therethrough in a known manner. The water inlet and outlet connections are shown only briefly schematically in FIG. 1. Such connections do not in and of themselves form the present invention and may be any such connections which are known in the art, the object being to allow for a continuous circulation of cooling liquid, such as water, through the interior spaces 13 and 14 of the valve casing.

As shown in FIGS. 1 and 2, the mounting flanges 1 and 2 have interiorly formed therein steps or recesses 15 and 16, respectively, which form radially inwardly extending annular shoulders or projections which are radially inwardly continued by the outer cover plates 10 and the outer legs 9 of sealing rings 4 and 5, respectively. These steps or recesses are preferably formed to correspond in their radial extent to the thickness of the brickwork of refractory brickwork lining 17 with which the interior of the hot air conduit 3 is provided. Also, as shown in FIGS. 1 and 2, the interior portion of the casing is covered with a refractory brickwork lining.

It will be apparent from FIG. 1 of the drawings that when the valve plate is in the closed position, and also to a lesser degree when the valve plate is being moved between the closed and open positions, the pressure of the gas within the conduit will cause the valve plate to act on the respective sealing surface 6 with a very great stress. This stress is very substantial in modern blast furnace installations. Accordingly, such high stresses imparted to the respective sealing surface 6 will create a very high bending moment in the valve casing.

In order to absorb or accommodate this stress and bending moment in the most direct possible manner in the region of the mounting flanges 1 and 2, there is provided support means positioned within the interior space 14 for transmitting to the respective mounting flange 1 or 2 the stress imparted to the respective sealing surface 6. In accordance with the embodiment of the invention illustrated in FIGS. 1 and 2, this support means comprises an annular member 20 in the form of a truncated cone positioned within interior space 14 coaxially of the sealing rings. As shown in FIG. 1 of the drawings, the interior space 14 includes two space portions positioned on opposite axial sides of the axial position of the valve plate. Thus, there are provided two annular members 20. Each annular member 20 has a first end portion 22 at the larger diameter base thereof which is supported against and fixed to the respective mounting flange 1 or 2. As shown in FIG. 2 of the drawings, preferably first end portion 22 is fixed by welding both to the outer stiffening plate 12 and the mounting flange 1. Annular member 22 also includes a second end portion 23 formed by the smaller diameter base which is positioned freely in contact with and unattached to the respective inner leg 6 of the respective sealing ring. As shown in FIG. 2, second end portion 23 is preferably in free contact with but unattached to the inner stiffening plate 11 and the inner leg 6 of sealing ring 4. By having second end portion 23 in contact with but unattached to the inner leg 6, stresses from the sealing surface may be easily transmitted to the mounting flange 1, since annular member 20 extends at an angle between inner leg 6 and mounting flange 1. However, by not connecting the second end portion 23, the entire valve casing is free to absorb such stresses, and also to absorb thermal expansion and contraction, without creating stresses which would result in premature cracking and failure of the valve casing.

The annular member 20 is provided with a cross-sectional configuration such that the annular member 20 will not appreciably interfere with or restrict the flow of cooling water within the interior space 14. Specifically, annular member 20 may be provided with a plurality of openings (not shown) which afford an unimpeded flow of cooling water between the interior and exterior surfaces of the member 20, and which also reduce the weight of the annular member 20. It will of course be understood that such openings or holes are provided for a given installation such that the annular member 20 has sufficient strength to absorb the particular stresses being transferred from inner leg 6 to the respective mounting flange 1 or 2. Annular member 20 may further in the form of a continuous truncated cone with a passage slot (not shown) for allowing passage of the cooling water. In any case, it will be apparent from FIGS. 1 and 2 of the drawings that the cone-shaped annular member 20 has a cross-section which will not appreciably interfere with the flow of cooling water, thereby improving the cooling performance of the valve as compared with prior art gate valves of similar type.

Figure 3:
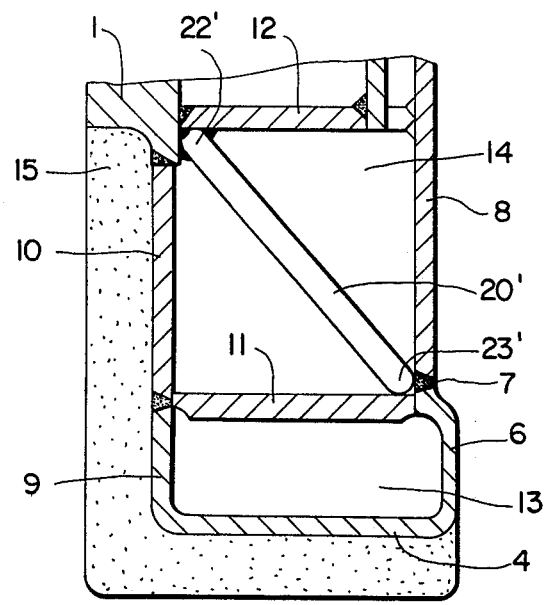
FIG. 3 is a view similar to FIG. 2, but illustrating a modified arrangement thereof.

With reference to FIG. 3, a modification of the embodiment illustrated in FIGS. 1 and 2 is shown. Thus, the structure of the valve casing in the modification of FIG. 3 is the same as in FIG. 2, except that the continuous truncated cone-shaped annular member 20 of FIG. 2 is replaced by a plurality of elongated members 20' which are circumferentially distributed within the interior space 14. Preferably, the elongated members 20' are uniformly distributed around the circumference. The elongated members 20' may be bolts, rods, tubes or lamellar members. The cross-section of such members may be round, oval, multi-sided or any other desired configuration. It will be apparent that in the embodiment of FIG. 3, since there are provided a plurality of circumferentially spaced elongated members 20', such members do not in any way appreciably interfere with or restrict the flow of cooling water within the interior space 14. The mounting of members 20' within the space is similar to the above described manner of mounting of annular member 20 of FIG. 2. Thus, first end portions 22' are attached, for example by welding, to the outer stiffening plate 12 and to the respective mounting flange 1 or 2. The second inner end portions 23' of the members 20' are in free contact with but unattached to the inner stiffening plate 11 and the inner leg 6 of the respective sealing ring.

The inclination of the annular member 20 of FIG. 2 or the elongated members 20' of FIG. 3 with respect to the center axis 21 of the sealing rings 4 and 5 is chosen such that the stress imparted to inner legs 6 may be transmitted to the respective mounting flange 1 or 2 in a generally direct resultant manner. The stress imparted to inner legs 6 is transmitted directly to the mounting flanges 1 and 2 without disturbing the desired elastic deformability and expandability of the valve casing.

Figure 4:
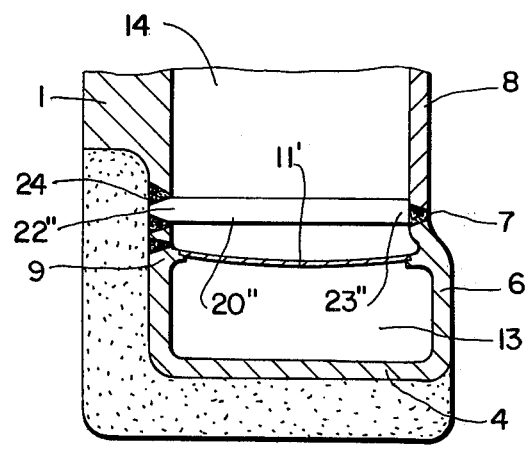
FIG. 4 is an enlarged cross-sectional view similar to FIGS. 2 and 3, but illustrating a further embodiment of the present invention.

With reference now to FIG. 4 of the drawings, a further embodiment of the present invention will be described. In this embodiment, the mounting flanges 1 or 2 are directly connected, for example by welding, to the outer leg 9 of the respective sealing rings 4 or 5. The support means in this embodiment of the invention comprise a plurality of elongated members 20" which may be the same type of members as discussed above regarding elongated members 20' of FIG. 3. However, elongated members 20" extend in directions substantially parallel to the center axis of the sealing rings. Further, the first end portions 22" of the members 20" extend into and are fastened, for example by welding, within holes 24 formed in the respective mounting flange 1 or 2. The second end portions 23" of the elongated members 20" are in free contact with and unattached to the respective inner legs 6 of the respective sealing rings. It will be apparent that this embodiment of the present invention operates in the same manner as the embodiments of FIGS. 1 through 3, with the exception that the stresses imparted to the inner legs 6 are transmitted to the respective mounting flanges in directions parallel to the center axis of the sealing rings.

In both embodiments of the present invention, the second end portion 23,23' or 23" of the support means is positioned adjacent to and in the region of the connection 7 between the respective inner leg 6 and the inner cover plate 8.

Although preferred embodiments of the present invention have been described and illustrated in detail, it will be understood that various modifications may be made thereto without departing from the scope of the present invention.

What is claimed is:

1. In a gate valve for use in large size conduits or pipe lines, particularly hot air conduits, said gate valve being of the type including a water cooled valve casing coaxially attachable to a conduit and a valve plate mounted in said valve casing for sliding movement relative thereto between open and closed positions of the conduit, the improvement wherein said valve casing comprises:
   a pair of annular mounting flanges adapted to be connected to the conduit;
   a pair of annular U-shaped sealing rings, each said sealing ring being positioned radially inwardly of a respective said mounting flange, said sealing rings being positioned on opposite axial sides of said valve plate;
   each said sealing ring including a web portion, an inner leg extending generally radially outwardly from said web portion and forming a sealing surface for said valve plate, and an outer leg extending generally radially outwardly from said web portion;
   means for connecting each said outer leg to the respective said mounting flange;
   said valve casing defining therein an enclosed interior space through which cooling water is adapted to flow; and
   support means, positioned within said interior space, for transmitting to at least one said mounting flange stress applied to the respective said sealing surface by said valve plate, said support means including a first end portion supported against and fixed to said one mounting flange and a second end portion freely contacting the respective said inner leg without attachment thereto, said support means having a cross-section substantially transverse to the direction of flow of cooling water within said interior space such that said support means does not appreciably intereferre with or restrict such flow.

2. The improvement claimed in claim 1, wherein said enclosed interior space includes first and second space portions provided on opposite axial sides of said valve plate, and said support means comprises at least one support element provided in each of said space portions.

3. The improvement claimed in claim 1, wherein said support means extends within said interior space at an angle to the center axis of said sealing rings.

4. The improvement claimed in claim 3, wherein said connecting means comprises a pair of outer cover plates, each said outer cover plate being connected to and extending generally radially between one of said outer legs and the respective said mounting flange, and further comprising outer and inner stiffening plates positioned within said valve casing coaxially of said sealing rings, and wherein said first end portion of said support means is supported against and fixed to said outer stiffening plate and said one mounting flange, and said second end portion of said support means is in free contact with said inner stiffening plate and said inner leg without attachment thereto.

5. The improvement claimed in claim 4, wherein said support means comprises an annular member in the form of a truncated cone positioned within said interior space coaxially of said sealing ring.

6. The improvement claimed in claim 4, wherein said support means comprises a plurality of elongated members circumferentially distributed within said interior space.

7. The improvement claimed in claim 1, wherein said support means extends within said interior space substantially parallel to the center axis of said sealing rings.

8. The improvement claimed in claim 7, wherein said connecting means comprises welds directly connecting each said outer leg to the respective said mounting flange, and said support means comprises a plurality of elongated members circumferentially distributed within said interior space, with first ends of said elongated members extending into and being fastened within holes in said one mounting flange.

9. The improvement claimed in claim 1, further comprising inner cover plates connected to and extending generally radially outwardly of said inner legs, and wherein said second end portion of said support means is positioned adjacent to and in the region of the connection between the respective said inner leg and inner cover plate.

10. The improvement claimed in claim 9, wherein said inner legs are connected to respective said inner cover plates by welds.

* * * * *